May 27, 1941.  A. KINDELMANN ET AL  2,243,212
SUPPORT FOR MOTION PICTURE PROJECTION MACHINES OR THE LIKE
Filed April 29, 1937  7 Sheets-Sheet 1

INVENTOR.
Albert Kindelmann
Claude A. Soehl.
BY Emery, Varney, Whittemore & Dix
ATTORNEYS.

May 27, 1941.  A. KINDELMANN ET AL  2,243,212
SUPPORT FOR MOTION PICTURE PROJECTION MACHINES OR THE LIKE
Filed April 29, 1937  7 Sheets-Sheet 4

INVENTOR.
Albert Kindelmann
Claude A. Soehl.
BY Emery, Varney, Whittemore & Dix
ATTORNEYS.

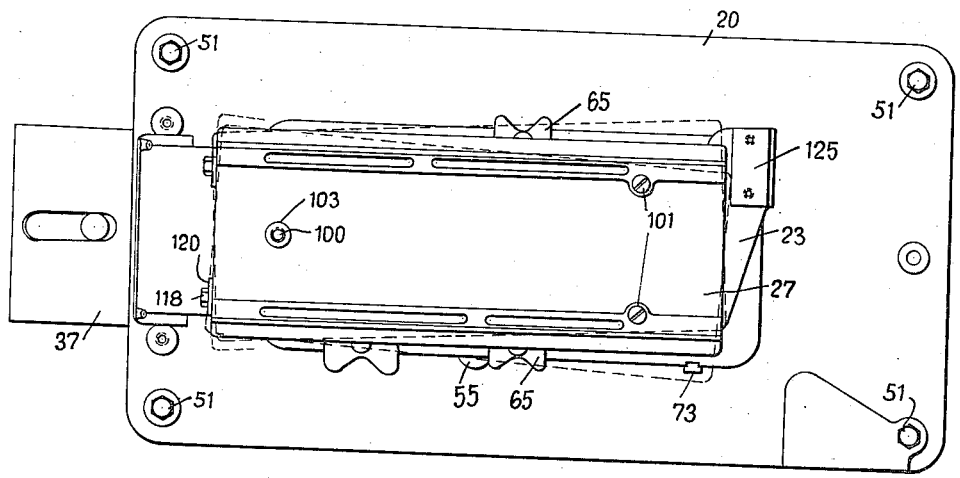
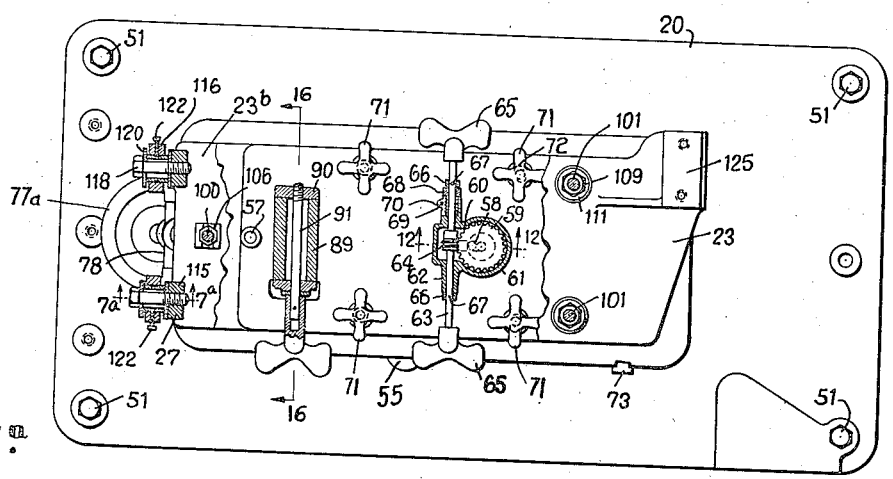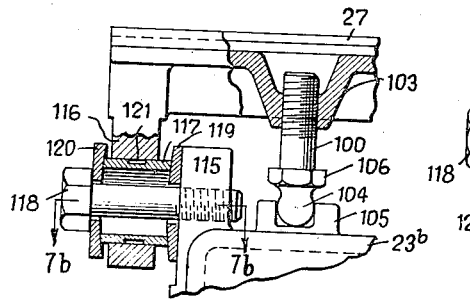

May 27, 1941.  A. KINDELMANN ET AL  2,243,212
SUPPORT FOR MOTION PICTURE PROJECTION MACHINES OR THE LIKE
Filed April 29, 1937   7 Sheets-Sheet 6
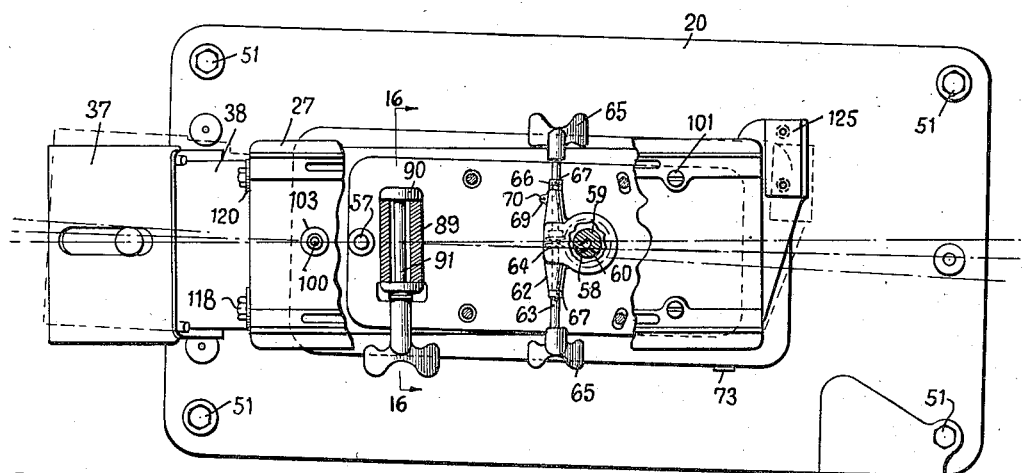
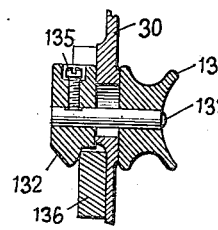
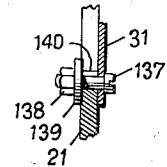
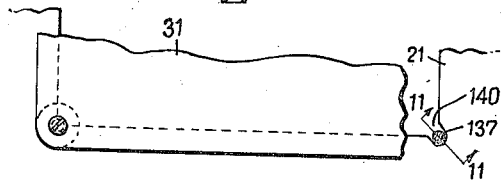
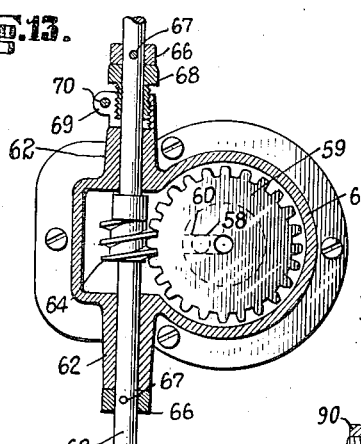
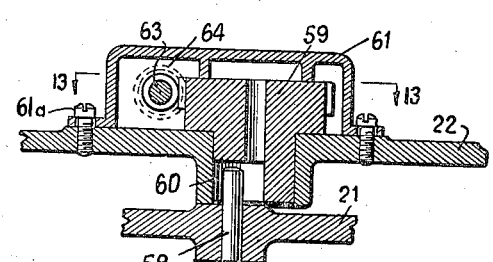
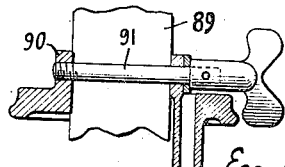
INVENTOR.
Albert Kindelmann.
Claude A. Soehl.
BY Emery, Varney, Whittemore & Dix
ATTORNEYS.

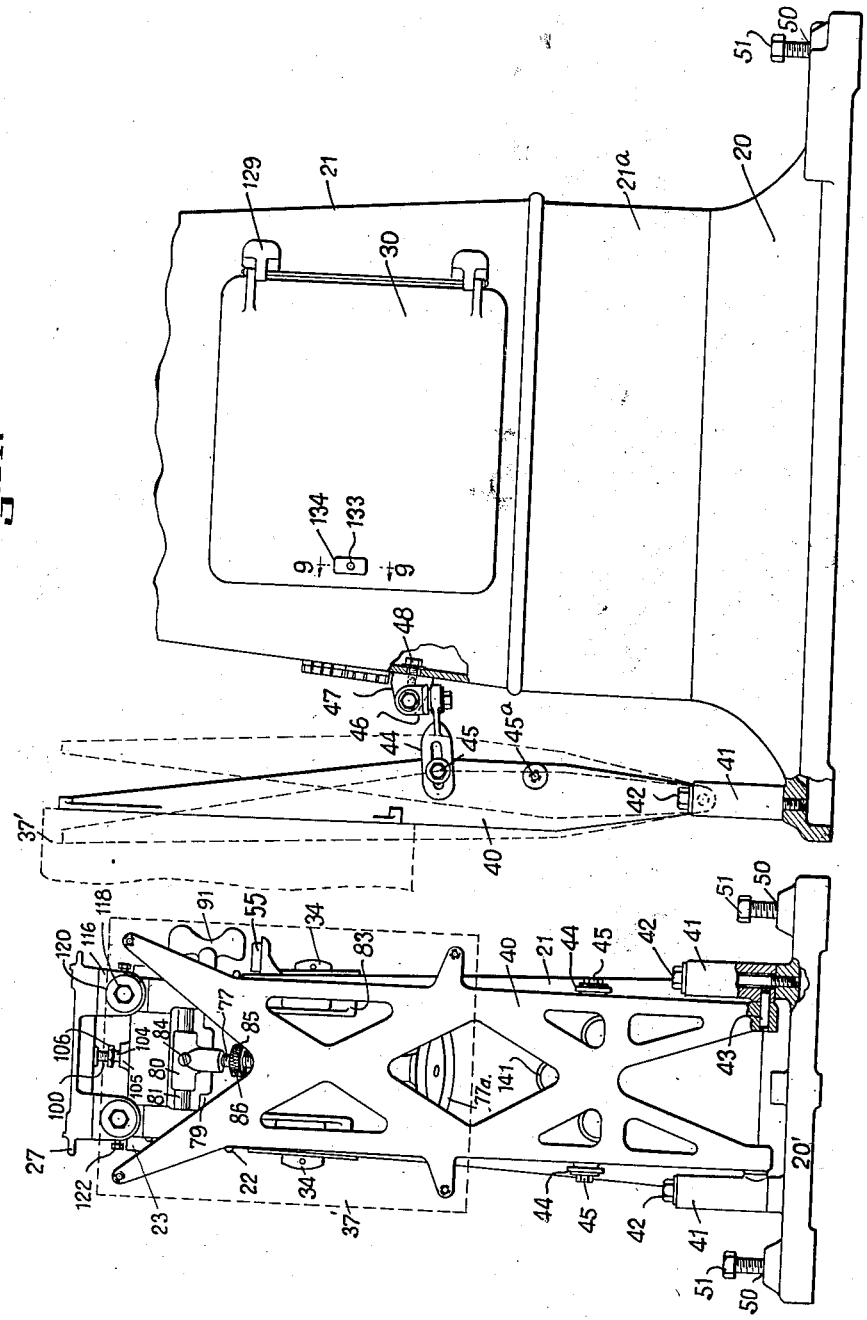

Patented May 27, 1941

2,243,212

UNITED STATES PATENT OFFICE 2,243,212

SUPPORT FOR MOTION PICTURE PROJECTION MACHINES OR THE LIKE

Albert Kindelmann, Floral Park, and Claude A. Soehl, Hensonville, N. Y., assignors to International Projector Corporation, New York, N. Y., a corporation of Delaware Application April 29, 1937, Serial No. 139,672

13 Claims. (Cl. 248—11)

This invention relates to supports, particularly to supports for motion picture projection machines or the like and has for an object the provision of improvements in this art. In the motion picture art these supports are often referred to generally as pedestals. The term "motion picture projection machine" is herein used in its broad sense to include means for projecting pictures or sound or either or both and all accessories used therewith.

Throughout the remainder of the specification the invention will be discussed with particular reference to motion picture projection machines but at the same time its availability for other uses is to be kept in mind.

Using the terms of description applicable to motion picture projection machines, it may be explained that as the versatility and preciseness of duty required of projection machines and their accessories has increased—and along with these a great increase in size and weight of the projection machines—there has arisen an urgent demand for a support which is designed and intended to carry the added weight of the machines; which will be completely steady and accurate; and which will provide within itself all of the many adjustments required in setting up or installing and in operating the projection machine. Such an improved machine eliminates vibrations of the picture on the screen, and the sound reproduction is free of many of the former extraneous noises.

The lack of adjustments in earlier machines was not so serious because the machines were light enough to be easily moved by hand without mechanical adjusting mechanism. But the artistry and precision of modern photography, aurography or the art of sound recording, and projection (of both sound and pictures) demand more accuracy and smoothness of adjustment than can possibly be obtained by hand without suitable adjusting mechanism. Supports heretofore provided appear to have been improvisations upon existing types of supports to satisfy immediate demands. So far as is known, there have been no supports provided which fully satisfy present demands. In other words, there does not appear to have been any broad approach to the problems such as would be expected if they had been newly presented together at one time. Or to put it still another way, support or pedestal designs have carried forward too many vestigal relics of the past.

The present invention is intended to overcome the enumerated as well as other difficulties and to provide a support which is sturdy and rigid; which provides mechanical adjustments to serve all the normal requirements of installation and operation; and which employs adjusting mechanism which is simple and easy to operate and readily and firmly locked in position. Supports embodying the present invention which have been built and used have proved that the objects of the invention have been satisfactorily accomplished.

One of the features of the invention is the provision of a support or pedestal which comprises standard interchangeable parts to vary the height of the pedestal.

Another feature of the invention is the provision of a hollow pedestal of relatively large size to furnish great rigidity and steadiness and adequate interior space to receive all wiring, switches, accessories and the like, the switches and other controls and accessories being conveniently located for the operator, and the pedestal being provided also with convenient access openings and closures therefor and with improved means for mounting and securing the closures.

Another feature of the invention is the provision of improved means for levelling the pedestal and indicating when it is level.

Another feature of the invention is the provision of an improved pedestal cap or pedestal arm support which carries all of the projection mechanism, (this term including the picture projection head, the sound head, the lamp house and all accessories mounted therewith) said cap or pedestal arm support being mounted on the pedestal in such a way as to permit lateral movement of the projection mechanism, preferably in a horizontal plane, for example, about a vertical pivot.

Another feature of the invention is the provision of improved means for laterally adjusting the pedestal cap or pedestal arm support and the mechanism carried thereon, the adjustment having easy action and micrometer precision whereby pictures may be accurately registered on the screen to a very small fraction of an inch, even when the screen is at a great distance from the projection machine. This is highly important in all cases and indispensable in matched picture projection.

Another feature of the invention is the provision of improved means for clamping the pedestal cap or pedestal arm support securely at any of a number of places after it has been adjusted whereby to lock it securely in adjusted position without distributing the adjustment, to eliminate all vibration or disadjustment.

Another feature of the invention is the provision of means for tilting the pedestal arm or plate carrying all of the projection mechanism, in a vertical plane, for example, about a horizontal pivot. This means comprises mechanism which acts selectively through several stages whereby the parts may be made short and sturdy and easily accessible. It also comprises mechanism for accurately guiding and rigidly locking the tiltable parts in any adjusted position whereby vibration and dis-adjustment are avoided.

Another feature of the invention is the provision of means for adjusting the lamp house independently of the adjustments for the remainder of the projection mechanism whereby the axis of the beam of light may be accurately registered with the optical axis of the projection machine. The lamp house adjusting means together with improved locking means employed therewith are claimed herein only so far as they affect the general combination support disclosed. The specific features of the lamp house adjusting and locking mechanism per se are claimed in our co-pending application, Serial No. 139,673, filed April 29, 1937 now Patent No. 2,211,825 dated August 20, 1940.

Another feature of the invention is the provision of improved switch devices and mountings for the apparatus.

Another feature of the invention is the provision of improved means, including certain standardized connections, for mounting various projection heads on the support, the term "projection head" herein including the picture projection head, sound head and all accessories mounted therewith.

Yet another feature of the invention is the provision of means for selectively operating various mechanisms from either side of the apparatus.

The enumeration of certain objects and features of the invention is not to be considered as exclusive of others which may be inherent in the invention or in the apparatus in which it is here embodied, whether enumerated or not.

A specific embodiment of the invention will now be described in detail in order to furnish a more concise understanding of the nature and objects of the invention itself. During this description reference will be made to the accompanying drawings showing a motion picture projection machine. In these drawings:

Fig. 6 is a top plan view;

Fig. 7 is a horizontal section taken approximately on the line 7—7 of Fig. 3;

Fig. 7a is an enlarged section of a detail, the view being taken on the line 7a—7a of Fig. 7;

Fig. 7b is a section taken on the line 7b—7b of Fig. 7a;

Fig. 8 is a horizontal section taken approximately on the line 8—8 of Fig. 3;

Fig. 9 is an enlarged vertical section of a closure latch device, the view being taken on the line 9—9 of Fig. 3;

Fig. 10 is a side elevation partly broken away to show in more detail a closure which appears in Fig. 2;

Fig. 11 is a section taken on line 11—11 of Fig. 10;

Fig. 12 is an enlarged vertical section of the mechanism for producing lateral displacement of the pedestal cap or pedestal arm support, the view being taken on the line 12—12 of Fig. 7;

Fig. 13 is a horizontal section taken on the line 13—13 of Fig. 3 and Fig. 12;

Fig. 14 is a right side elevation showing a modified form of pedestal base and a modified form of lamp switch mounting;

Fig. 15 is a rear elevation but showing an extension member in the pedestal and with the anchorage for the switch mounting in a different position; and Fig. 16 is a vertical section of a detail, the view being taken on the line 16—16 of Fig. 7 and Fig. 8.

Figure 1:
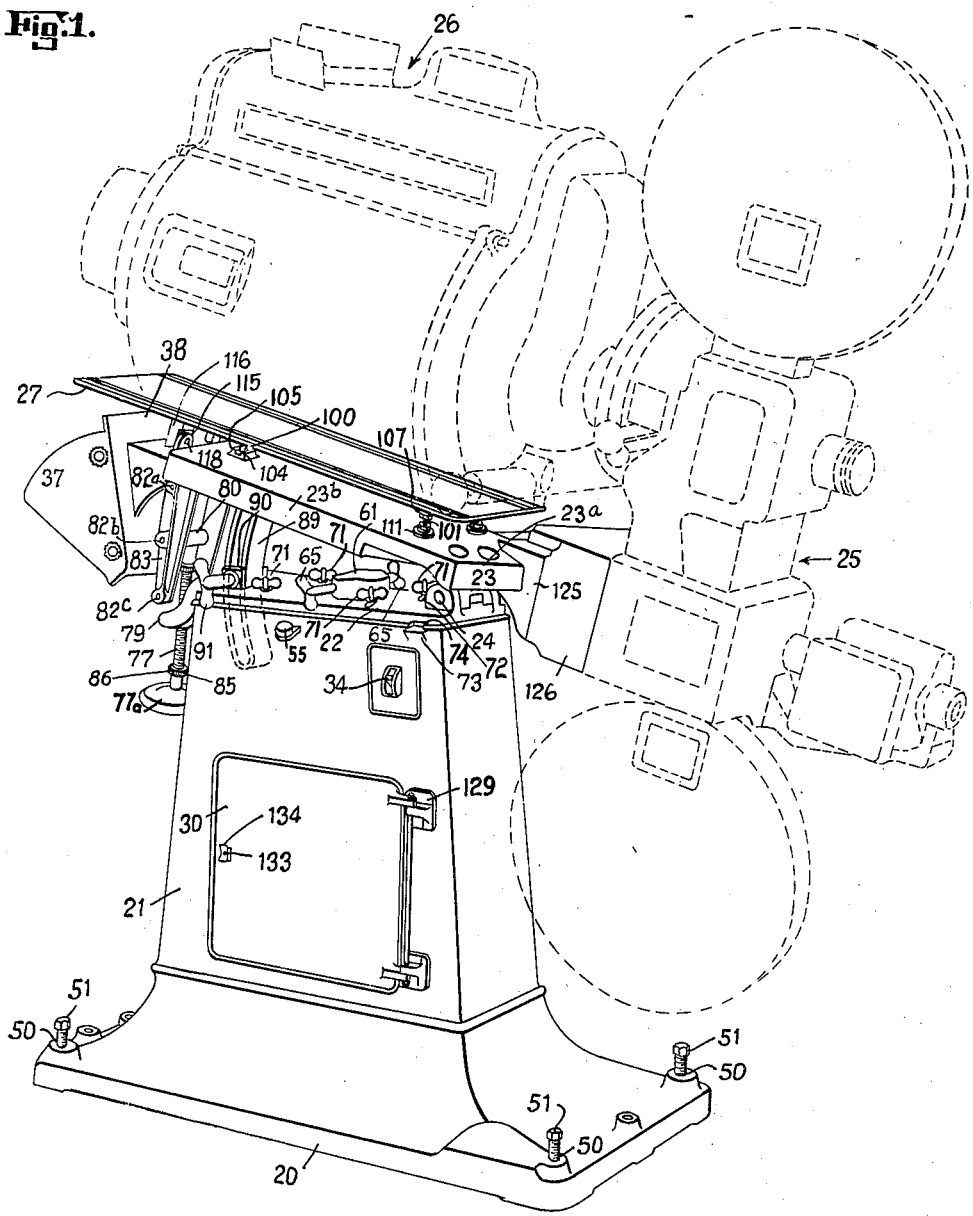
Fig. 1 is an elevational view in perspective looking at the right or operating side of the projection machine.
Figure 2:
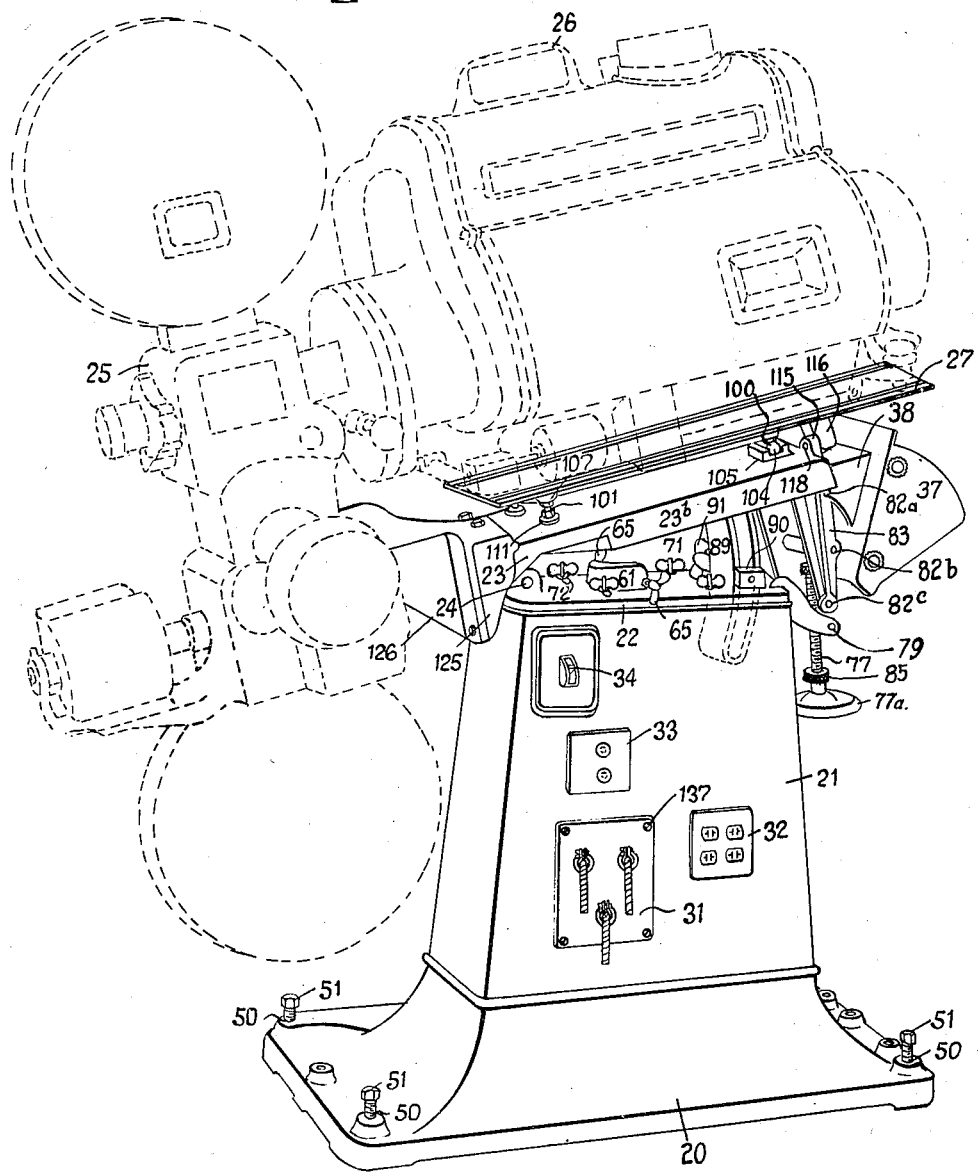
Fig. 2 is a similar perspective view looking at the left or non-operating side of the machine.
Figure 3:
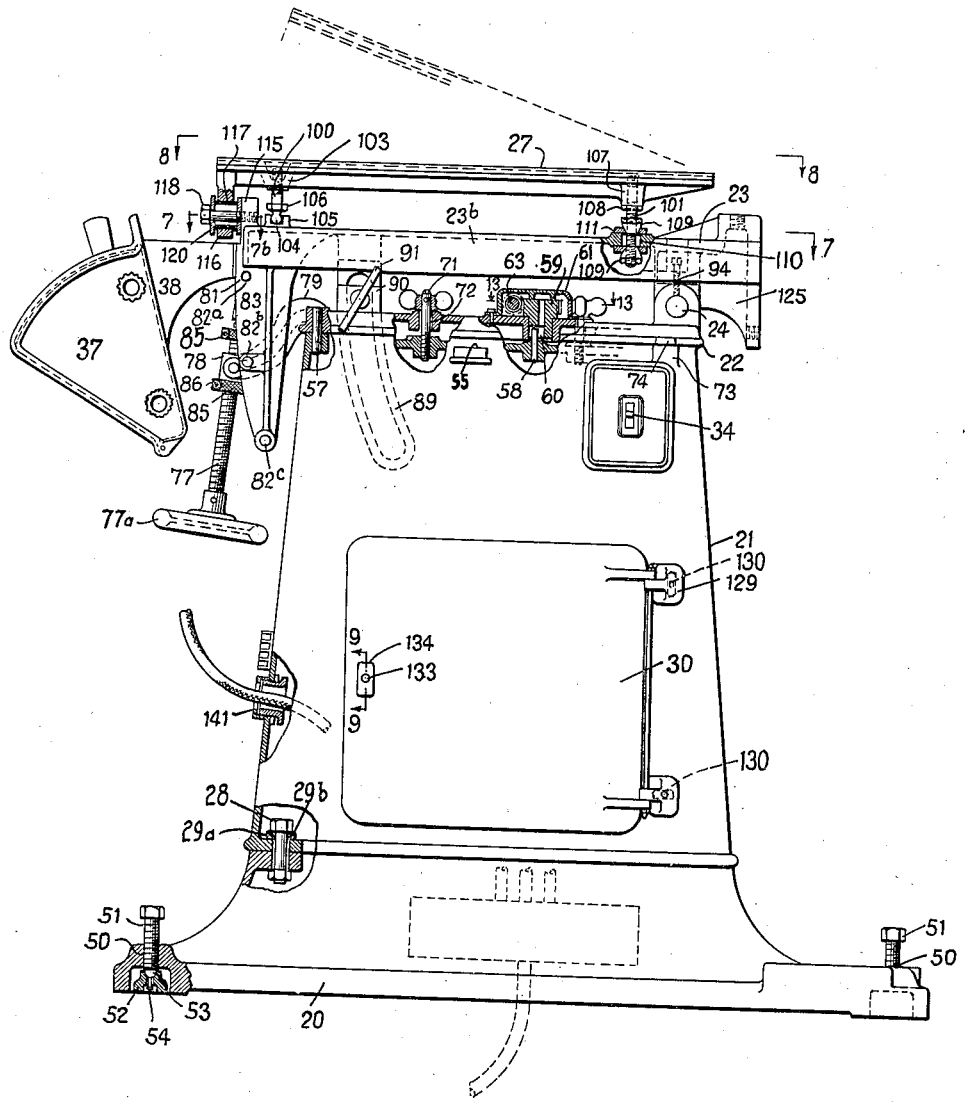
Fig. 3 is a right or operating side elevation, showing certain parts in section, and with the projection head and its bracket support and the lamp house removed from the support.

Referring to the drawings, particularly Figs. 1 and 2, the projection machine is seen to comprise and be mounted upon an improved support or pedestal which includes a base 20, a stand 21, a laterally adjustable pedestal cap or pedestal arm support 22 and a vertically adjustable pedestal arm 23. As shown in Fig. 3, the pedestal stand 21 may be secured to the base 20 by bolts 28 passing through over-sized holes in interior lateral flanges formed on the base and stand. A pair of dished nesting washers 29a, 29b placed under the head, and if desired a pair of similar washers under the nut on the bolt, provide secure attachment between the parts even if, due to casting tolerances, the holes in the stand and base do not match. The height of the pedestal may be varied to suit conditions by using a low base 20', as shown in Fig. 15, when a short pedestal is desired, or by using a stand extension member 21a, as shown in Fig. 14, when a tall pedestal is desired.

The pedestal arm 23 (Fig. 1) is mounted to tilt about a horizontal shaft 24 and comprises a front portion 23a on which a projection head 25 is mounted through suitable means and a rear portion 23b on which a lamp house 26 is mounted through suitable means. The projection head 25 and the lamp house 26 are shown in phantom lines since per se they constitute no part of the present invention. The lamp house may be removably mounted upon a lamp house carriage or plate 27.

In the preferred form of the invention the pedestal is formed as a substantial box-like casing instead of being formed of tubular columns, rods or posts as has been common in the past. This provides unusual rigidity and steadiness, so useful in modern precision projection. Moreover, the ample space within the hollow pedestal may be utilized for the reception of electrical feed lines, switches receptacles and various accessories for the projector, or even for the storage of tools and various other articles. By placing all the electrical feed lines within the pedestal casing the exposure of wires and cables at the floor is avoided and underwriters' requirements are complied with.

On one side, the operating side, the pedestal stand 21 (Fig. 1) is provided with an opening and a hinged door or closure 30 therefor to give access to the interior of the pedestal. On the other or non-operating side (Fig. 2) an opening and an outlet bushing plate 31 therefor are provided.

On one or both sides of the pedestal a service receptacle panel 32 (Fig. 2) is provided for serving extension lights or other electrical accessories used in connection with the projection machine.

On one or both sides of the pedestal there is provided a receptacle panel 33 (Fig. 2) to be used for connections of a more permanent type such as that for the cable to the projection head motor and the cable of the change-over mechanism used in coordinating the operation of one machine with that of another. The receptacle is of the lock type in keeping with the semi-permanent type of service provided by it.

On one or both sides of the pedestal, preferably on both sides as shown in Figs. 1 and 2, there are provided motor switches 34 for controlling the operation of the drive motor of the projection head 25. This permits the motor to be turned on or off from either side. As shown in Fig. 3, improved means are provided for anchoring the switches 34 on the pedestal, and if desired, similar anchorage means may be provided for other switches, receptacles or the like. As shown, the pedestal is provided with an anchor bracket 35 located behind the pedestal casing wall, and this bracket is provided with slots 36 from one edge to receive bolts for attaching the switch box to the bracket. The provision of slots in the casting avoids the necessity for drilling holes for the attaching bolts and provides adjustment in mounting the switch box.

At the rear end of the machine there is provided a switch 37 for controlling current supply to the lamp (either arc, filament or any other suitable type) in the lamp house 26. For light duty the switch box may be mounted on a bracket 38 of a part, such as the pedestal arm 23, which in general moves with the lamp house.

For heavy duty the larger switch box 37' (Figs. 14 and 15) may be mounted upon a swingable bracket 40. The bracket 40 is mounted upon a pivot supports 41 secured by screws 42 to the base 20. The pivots 43 are placed at one end of the members 41 so that by turning the latter end-for-end the height of the pivots and hence of the switch bracket and switch can be changed. The bracket arm is retained by a toggle device comprising a slotted link 44 secured to the bracket by a screw 45 passing through the slot, a two-way pivot member 46, and an anchor member 47 secured to the pedestal stand by a screw 48. The screw 45 may engage the bracket arm at either of two positions depending on the height at which the bracket is mounted. The lower hole for the screw 45 is indicated at 45a. Other holes, either in the bracket arm or in the pedestal casing may be provided and the toggle assembly may be turned upside down, thus furnishing a great range of adjustment. By this arrangement the switch box may be moved inward or outward and secured at any desired position. This is indicated in dotted lines in Fig. 14.

The pedestal may be levelled by any appropriate means. For example, as shown in Fig. 3, the base 20 is provided with a tapped hole 50 adjacent each of the four corners to receive levelling screws 51. The levelling screws are provided with angularly adjustable pads 52. The angular adjustment is provided by a ball and socket joint 53 between the screw and pad. The pad is retained on the screws by a small retaining screw 54 passing loosely through an opening in the pad and threaded into the end of the screw 51. When the pads are in the fully raised position they clear the floor to avoid injury when moving the machine. A bubble level 55 may be mounted on the side of the pedestal to indicate its position.

Means are provided for moving all of the pedestal-surmounting mechanism laterally and with great accuracy and smoothness, whereby the picture may be accurately registered on the screen to a small fraction of an inch even when the projection distance is great. The means herein shown for this purpose comprises mechanism cooperating with the pedestal cap or pedestal arm support 22. The pedestal arm support 22 fits on a smooth finished surface on the top of the pedestal stand and has an easy sliding movement thereover. At its rear end the pedestal arm support is pivoted upon a pin 57, as shown in Figs. 3, 7 and 8, for controlled movement about the pin as an axis.

The means herein provided for adjusting the lateral position of the pedestal arm support 22 is shown in Figs. 3, 7 and 8 and in enlargement in Figs. 12 and 13. A pin 58 is fixed in a transverse member at the top of the pedestal stand. A spiral gear 59 is rotatably mounted on the pedestal arm support 22 above the pin 58. The gear center is eccentric to the pin 58 and the hub of the gear is provided with a radial slot 60 slidably receiving the pin. The gear is retained by a housing 61 which is provided with bearing extensions 62 for the shaft 63 of an adjusting spiral pinion 64. At opposite ends the shaft 63 is provided with winged hand pieces 65 for turning it from either side of the machine. The housing (Fig. 13) is retained on the pedestal arm support by screws 61a and these screws fit in oversized holes in the housing flange in order to provide adjustment of the housing and hence of the pinion 59 relative to gear 64.

Means are provided for taking out endplay of the shaft 63 so as to make the adjustment very accurate and the movement very positive in either direction. As shown in Fig. 13, this means comprises a collar 66 secured to the shaft 63 by a pin 67 at the end of one of the bearing extensions 62. A similar collar 66 is likewise secured to the shaft 63 by a pin 67 adjacent the end of the other bearing extension 62 but at a short distance from it. An adjustable thrust nut 68 is threaded into the end of the bearing extension so it may be backed off to engage the second-named collar 66. The end of the bearing extension is slitted from one side and provided with ears 69 through which a clamping screw 70 passes. This furnished a means for clamping the thrust member in any adjusted position.

Means are provided for clamping the pedestal arm support 22 in position after adjustment. This means comprises a plurality of clamping screws 71 (four as shown, Figs. 1 and 7) passing through clearance holes 72 in the pedestal arm support (Fig. 8) and threaded into the top of the pedestal stand.

Figure 5:
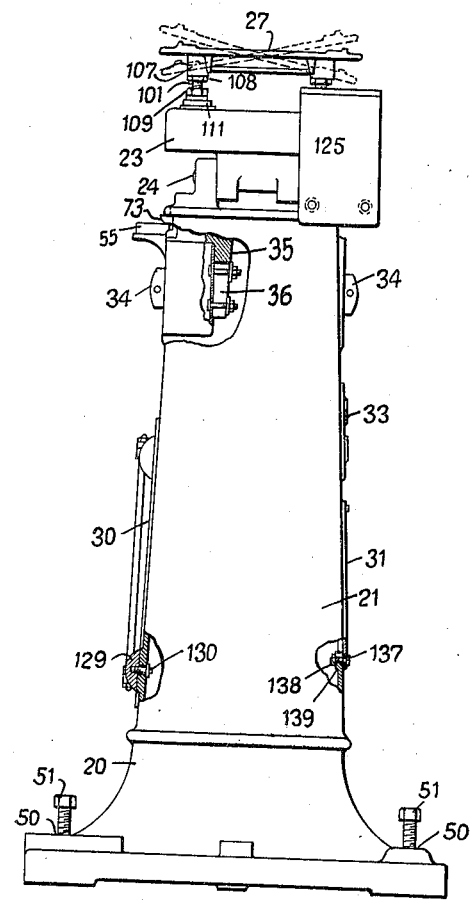
Fig. 5 is a front elevation showing certain parts in section.

Means are provided for indicating the lateral position of adjustment of the pedestal arm support 22. This means as shown in Figs. 1, 5 and 7, comprises a partly protruding member 73 on the pedestal stand having a machined upper surface over which the pedestal arm support 22 moves with a close fit and a machined vertical surface 74 on the side of the pedestal arm support cooperating therewith. The machined surface of the member 73 may either be provided with a permanent scale or be marked upon as desired to record positions of the pedestal arm support. Instead of employing a horizontal surface on the member 73, the vertical surface 74 of the member 22 may engage the movable element of a micrometer indicator which is anchored to the pedestal stand.

Means are provided for tilting the pedestal arm 23 about the pivot shaft 24 and for clamping it in any adjusted position. The adjusting means operates very easily, smoothly and accurately in order that the picture may be adjusted vertically almost imperceptibly and with great accuracy on the screen even when the projection distance is great. The means herein shown as suitable for this purpose comprises a tilting screw 77 (Figs. 3 and 4) threaded in a pivoted nut 78 mounted between bracket arms 79 secured to and movable with the pedestal arm support 22. The pivot axis of the nut 78 intersects the axis of the screw 77 to provide smooth action of the screw in the nut. The end of the tilting screw is rotatably secured in a T-shaped screw anchor 80. An anchor rod 81 enters a transverse bore in the head of the T-shaped anchor and at its ends enters a selected pair of aligned paired holes 82a, 82b or 82c in bracket arms 83 secured to the rear end 23b of the pedestal arm 23. The axis of the rod 81 intersects the axis (extended) of the screw 77 to provide smooth action of the screw in the anchor member 80. The rod 81 may be passed laterally into or out of its connecting position in the T-shaped anchor and a pair of holes in the bracket arms, whereby the tilting screw may be anchored at any pair of the series of holes 82a, 82b or 82c. When in connecting position the rod may be secured in position by a set screw 84.

Movement of the tilting screw may be limited by locking nuts 85 threaded on the screw. The nuts are split from one side—even being cut through almost completely for resiliency if desired—and are provided with lock screws 86 whereby they may be clamped in position on the tilting screw.

Means are provided for locking the pedestal arm 23 in any adjusted position. This means comprises a slotted arcuate quadrant 89 secured to and depending from the pedestal arm 23. The quadrant passes through the pedestal arm support and down into the pedestal stand as shown in dotted lines in Figs. 1, 2 and 3. On either side of the quadrant are disposed upstanding clamping members 90 secured to the top of the pedestal arm support. As shown in Fig. 16, one of the clamping members extends upward directly from the upper surface of the pedestal arm support, but the other member is made J-shaped, extending first downward and then upward. This furnishes the necessary resilience for clamping, yet provides a firm substantial connection. A clamping screw 91 passes through one of the clamping members and through the slot of the quadrant and is threaded into the other clamping member.

In making vertical adjustments the quadrant 89 is unclamped while the tilting screw 77 is operated by the handwheel 77a and clamped after the adjustment has been made. The quadrant should also be clamped when the anchor rod 81 is being transferred from one set of holes to another.

By providing several stages of adjustment the tilting screw 77 and related parts may be kept short and small and the handwheel 77a of the tilting screw kept within easy reach of the operator. Moreover, the same tilting screw of a fixed length may be made to serve for all adjustments. When the projection head 25 and the lamp house 26 are mounted on the pedestal arm the weight of parts is substantially balanced about the pivot shaft 24 of the pedestal arm so that the adjusting movements may be easily and smoothly made. The shaft 24 is removable endwise and may be locked in operative position to the pedestal arm 23 (Fig. 3) by a set screw 94.

Means are provided for adjusting the position of the lamp house to bring the axis of the beam of light produced thereby into registry with the optical axis of the projection machine. Means are also provided for locking the lamp house in any adjusted position whereby all portions thereof may be rigidly maintained in position against vibration.

The lamp house support hereby provided furnishes the fullest possible range of adjustment of the lamp house. In the embodiment illustrated, and assuming the pedestal arm to be in its lowermost or horizontal position, the lamp house has the following movements:

1. It may be raised or lowered bodily.
2. It may be raised or lowered at the front end only.
3. It may be raised or lowered at the rear end only.
4. It may be raised and lowered conjointly in opposite directions at the front and rear ends.
5. It may be raised or lowered on the right side only.
6. It may be raised or lowered on the left side only.
7. It may raised or lowered conjointly in opposite directions on the right and left sides.
8. It may be raised or lowered at any corner.
9. It may be raised and lowered conjointly in opposite directions at two diagonal corners.
10. It may be moved laterally in either direction at the front end only.
11. It may be moved laterally in either direction at the rear end only.
12. It may be moved laterally at both ends together in either direction.
13. Or it may be moved laterally conjointly in opposite directions at opposite ends.

Considering all possible movements together it is seen that a number of movements in addition to universal movement are provided for. Universal movement is considered to be movement about three coordinate axes (not necessarily intersecting axes). Movements 2, 3 and 4 above may be considered as part of the universal movement about a transverse horizontal axis. Movements 5, 6 and 7 may be considered as part of the universal movement about a longitudinal horizontal axis. Movements 10, 11 and 13 may be considered as part of the universal movement about a vertical axis.

In addition to movements 2, 3, 4, 5, 6, 7, 10, 11 and 13 which fairly constitute the universal movement, there remains movement 1 which may be referred to as the elevating movement or vertical translation. This may be movement into successive parallel planes, either horizontal or tilted in any direction, or it may be a combined elevating and tilting movement.

There also remains movement 8 which may be referred to as the corner tilting movement.

Again there remains movement 9 which may be referred to as the diagonal corner tilting movement. It is a movement about coordinate diagonal horizontal axes.

Finally there remains movement 12 which may be referred to as the sidewise traversing movement or horizontal translation.

It is thus seen that there is universal movement, four distinct movements in addition to the universal movement, universal and the four other movements in any translated or tilted position, and all combinations of these movements.

These various movements are all provided by a special three point support. The parts are firmly secured after adjustment by a four point locking connection.

As shown in Figs. 3, 6 and 7, the lamp house carriage or plate 27 is supported by three spaced legs in the form of adjustable screws 100, 101, 101. The pair of screws 101 are located near the front end and are equally spaced from the front and sides of the carriage or plate 27. The screw 100 is disposed alone at the center and near the rear end of the plate 27.

The rear screw 100 is threaded into a crater 103 formed in the plate 27, which insures that the upper end of the screw will not emerge above the top of the plate to interfere with parts carried thereon. The lower end of the screw is provided with a spherical knob 104 which operates within a transverse groove formed between two raised guides 105 carried by the pedestal arm 23. Intermediately the screw is provided with an integral non-circular flange or nut 106 by which it may be turned. The screw may be adjusted to move the plate 27 up or down or may be adjusted in position in the groove to support the plate when moved in either direction laterally. The plate may also be tilted in any direction about the spherical knob 104. By mounting the head of the screw 100 in the transverse groove, the parts are prevented from sliding toward one end when the connections are loosened for adjustment in the tilted position of the pedestal arm.

The front screws 101 are rigidly secured in tubular projections or bosses 107 formed on the lamp house plate 27. The upper ends or heads of the screws are recessed below the upper surface of the plate 27 and the screws are rigidly secured to the plate by nuts 108. The lower end of the screws 101 pass through slots 110 formed in the pedestal arm and upon the screws are threaded spaced acorn nuts 109 having convex surfaces disposed toward each other on opposite sides of the pedestal arm. Washers 111 having concave seats cooperating with the convex surfaces of the nuts 109 are interposed between the nuts and machined bosses at the sides of the slots. The washers have flat lower surfaces which cooperate with the flat machined surfaces formed on the bosses. The slots are large enough to permit lateral movement of the screws in any direction but the largest movement provided for is transversely of the pedestal arm. The nuts 109 are adapted to raise and lower the lamp house plate and also to lock it in position after adjustment. The lower nuts 109 may be referred to as the locking nuts since they usually are not required to pull the parts down but only to lock them in position.

Since the rear end of the lamp house plate is supported during adjustment only by the single screw 100 at the center, the corners would be left overhanging without support if not otherwise provided for. It is desirable that the corners be directly supported to minimize vibration and avoid possible breakage. Moreover, the particular adjusting device 100 provided at the rear end of the lamp house plate does not lock in position in the groove in which it moves, so it is desirable to lock this end of the plate against movement after the adjustment has been made.

Figure 4:
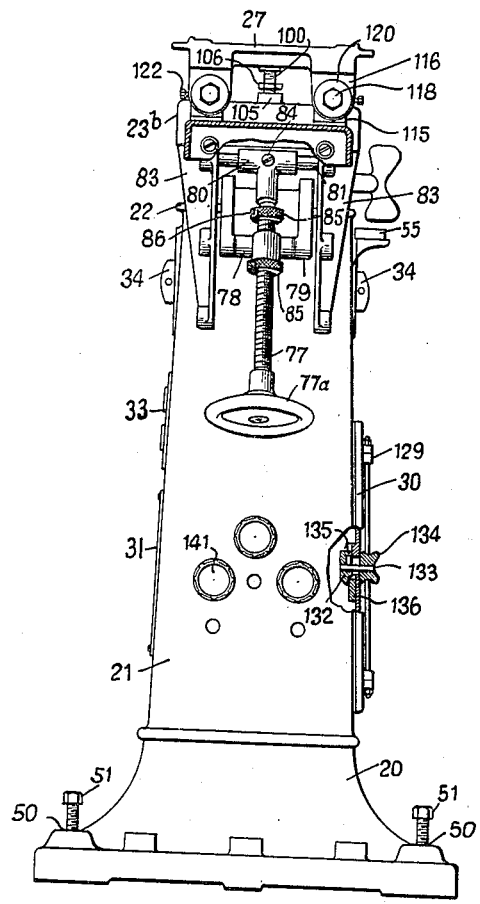
Fig. 4 is a rear elevation showing certain parts in section.

The means hereby provided for locking the rear corners of the lamp house plate, as shown in Figs. 3, 4 and 7, comprises interrelated parts on the lamp house plate and the pedestal arm which are movable relative to each other and are locked together when desired by any suitable means. In the specific embodiment illustrated, the pedestal arm 23 is provided at its rear end with upstanding lugs 115 and the lamp house plate is provided with depending lugs 116 so located that they are disposed just behind the arm lugs 115. The plate lugs 116 are provided with oversized openings within which are fitted oversized sleeves or bushings 117 which are somewhat longer than the openings. Locking screws 118 pass through the sleeves and at their inner ends are threaded into the arm lugs 115. Washers 119 and 120 are placed between the ends of the sleeves and adjacent parts.

The inner washers 119 are made convex on their outer (rear) faces and the outer (rear) washers 120 are made concave on their inner (front) faces. This provides clamping surfaces of substantial area between the washers and the ends of the sleeves in any adjusted position so that the locking action may be secure when the screws are tightened. The ends of the sleeves may be shaped to fit the curved surfaces of the washers. The curved surfaces are formed (Fig. 7a) as approximately spherical surfaces drawn from a center on the extended axis of the screws 118. The axes of the locking screws 118 are located approximately in the same horizontal plane as the center of the knob 104.

It will be evident, since the rear end of the lamp house plate can move laterally or vertically away from the central position selected for determining the shape of the curved surfaces, that the curved surfaces will not always have a perfect fit with adjacent parts, for the permissible movements of the lamp house plate are very complex but they will have a closer approximation to a fit than if the surfaces had been otherwise determined or simply made flat.

The sleeves 117 have a small longitudinal movement within their openings in the lugs 116 in order that the parts may be clamped together without strain. Means are provided for retaining the sleeves while permitting this longitudinal movement. As shown in Fig. 7b the sleeves are provided with annular exterior grooves 121, and set screws 122 threaded in the lugs 116 enter these grooves to retain the sleeves.

The mounting means for the lamp house plate will be seen to be capable of providing all of the movements referred to. Some of the movements are indicated in dotted lines in Figs. 3, 5, 6 and 8.

Means are provided for mounting different head brackets on the pedestal arm. This means is standardized so that the same pedestal arm connection will serve for any and all types of brackets for different heads although the mounting means of the heads themselves may vary greatly. This is provided by forming a standard bracket connection 125 on the front end of the pedestal arm. An interposed adapter connection or bracket 126 is provided. This has a standard shape to fit the arm connection 125 at the rear end but its front end is varied in shape to suit the particular type of head which is used. In mounting different heads it is therefore only necessary to use the proper adapter bracket for the selected head. Thus by replacing a single simple member the device is made to accommodate a large variety of equipment.

The door 30 is provided with hinges which may be quickly attached and adjusted to correctly place the door. The door is also provided with a latch which will automatically lock when the door is closed and prevent rattling after the door is closed.

The hinges (Fig. 5) comprise anchor brackets 129 which may be placed against the side of the pedestal stand, and secured by screws 130 passing through holes in the wall of the stand from the inside and entering tapped holes in the brackets. As shown in dotted lines in Fig. 3, the holes are made oversize and one (the upper) is elongated vertically and the other (lower) is elongated horizontally to provide suitable ready adjustment in the mounting of the door.

The door latch (Figs. 4 and 9) comprises a latch keeper 132 operating between vertical guides on the inside of the door, a rod 133, and a handle 134 on the outside of the door. The keeper is secured to the rod by a set screw 135. The latch engages a bar 136 which extends inward from the side of the door opening. The latch keeper is bevelled on its rear lower edge so as to ride over the bar and catch when the door is closed. It is bevelled on the front side at the bottom so as to wedge down on the bar and hold the door tight against rattling when closed. This avoids the necessity for making adjustments to prevent rattling and also permits manufacturing tolerances.

The outlet bushing plate 31 (Figs. 10 and 11) is secured by screws 137 provided with nuts 138 and washers 139. In order to avoid casting or drilling holes for the screws 137, the opening for the plate is cast with corner recesses 140 for receiving the screws.

Bushings 141 for electric cables to pass through the wall of the stand are shown in Figs. 3 and 4.

It is thus seen that the invention provides an improved pedestal of great strength and rigidity built of standardized members to vary the height of the pedestal.

It also provides improved means for levelling the pedestal and along with this, means for indicating at a glance when the pedestal is level.

It provides means for laterally adjusting all of the mechanism surmounting the pedestal and locking it securely in any adjusted position; and with this, means are provided for indicating the lateral position of the mechanism. This adjusting means is easily operated and of micrometer accuracy.

It provides means for vertically adjusting all of the mechanism surmounting the pedestal and locking it securely in any adjusted position. This vertical adjusting means comprises a device which operates through several selective stages whereby the parts may be made small and short and yet will be sturdy and accurate.

It also includes means for adjusting the position of the lamp house in numerous ways and directions to bring it into any desired position relative to the optical axis of the projection head. Along with this, means are provided for locking the lamp house securely in any adjusted position.

It also includes means of a standardized nature for mounting various types of heads on one mounting connection, this being accomplished through adapter brackets having standard coupling portions at one end for the bracket connection on the pedestal arm and variable coupling portions at the other end for various heads.

It also provides improved closure fittings and fastenings for the hollow pedestal stand.

It also provides means for operating control switches and various other mechanisms from either side of the machine thus increasing the convenience and reliability of the apparatus in use.

It also provides improved lamp switch mounting means whereby a switch may be readily mounted at various heights and be swung forward and backward as desired.

It will be noted that this improved support or pedestal provides for the ready accomplishment of the installation and of the making of any adjustments in the apparatus, and at the same time is so sturdy that the picture is projected on the screen without showing any signs of vibration, and the sound reproduction is effected free from the undesirable extraneous noises which have heretofore been manifest.

While the improved support has been illustrated and described herein as having features which are especially advantageous in the projection of motion pictures, it is to be understood that the support and many of its features are adapted for use in machines employed for other purposes.

Various other advantages and improvements provided by the invention will be apparent to those skilled in the art from the above description. The invention is therefore not to be limited to the exemplary embodiment disclosed since it may be variously embodied within the limits of the prior art and the scope of the subjoined claims.

We claim:

1. A support comprising in combination, a pedestal, a pedestal arm support mounted on the pedestal for lateral movement, means for moving said pedestal arm support laterally relative to said pedestal, means for locking said pedestal arm support in position on said pedestal, a pedestal arm mounted on said pedestal arm support for vertical tilting movement, means for tilting said pedestal arm, means for locking said pedestal arm in position on said pedestal arm support, a lamp house carriage mounted on said pedestal arm, a three point adjustable support for said lamp house carriage, and means for locking said lamp house carriage at four points.

2. A support comprising in combination, a pedestal, a pedestal arm support mounted on the pedestal for lateral movement about a vertical axis, a pedestal arm mounted on the pedestal arm support for tilting movement about a horizontal axis, and a lamp house carriage mounted on said pedestal arm through three spaced adjustable legs.

3. A support having in combination a pedestal, adjustable mechanism carrying means mounted on said pedestal comprising a first member mounted to move about a vertical axis, a second member pivotally mounted on the first member to swing about a horizontal axis and a lamp house carriage adjustably mounted on the second member.

4. A support comprising in combination, a pedestal, a pedestal arm support mounted thereon to move about a vertical axis near its rear end, a pedestal arm mounted on said pedestal arm support for tilting movement about a horizontal axis near its front end, and a lamp house carriage mounted on said pedestal arm through three spaced adjustable legs, two of the legs being in transverse alignment parallel with the front of the carriage and the other being medially disposed near the rear end of the carriage.

5. In a support for motion picture projection machines comprising in combination, a pedestal, a pedestal arm support movable about a vertical axis, and means for turning said pedestal arm support about its axis, said turning means comprising a fixed upstanding pin in said pedestal, a rotatable member carried by the pedestal arm support and having a slot engaging said pin, and means for turning said rotatable member to cause relative movement with said pin to turn the pedestal arm support.

6. In a support as set forth in claim 5 in which said turning means comprises a horizontal shaft carrying a gear meshing with a gear on said rotatable member, and means for taking out end play in said horizontal shaft.

7. In a support as set forth in claim 5 in which said turning means comprises a horizontal shaft carrying a gear meshing with a gear on said rotatable member, and means for taking out end play in said shaft comprising fixed collars on said shaft, one in contact with the end of a shaft bearing and one spaced from a shaft bearing, a thrust nut adjustably mounted between said spaced collar and the end of the adjacent bearing, and means for locking said thrust nut in adjusted positions.

8. A support comprising in combination, a pedestal, a pedestal arm support mounted for lateral adjustment on said pedestal, a pedestal arm supported for vertical tilting movement about a horizontal axis on said pedestal arm support, and means for adjusting the position of said pedestal arm, said adjusting means comprising a screw of limited length, and anchorage means for connecting said screw at a plurality of positions whereby the adjustment of the pedestal arm may be accomplished in several distinct and separate stages.

9. A support comprising in combination, a pedestal, a pedestal arm support carried by said pedestal, a pedestal arm mounted on said pedestal arm support for tilting movement about a horizontal axis, a multi-stage adjusting device for said pedestal arm which is disengageable therefrom at times when changing from one stage or range of action to another, and separate means for locking said pedestal arm in adjusted positions, said locking means serving to hold said pedestal arm in position while changing from one stage of adjustment to another.

10. A support as set forth in claim 9 in which said locking means includes a quadrant secured to said pedestal arm and means on said pedestal for clamping the quadrant in adjusted positions.

11. A support having in combination a pedestal, adjustable mechanism carrying means mounted on said pedestal comprising a first member mounted to move about a vertical axis, a second member pivotally mounted on the first member to swing about a horizontal axis, said second member being provided at its pivotal end with means to attach thereto any one of a plurality of apparatus carrying brackets.

12. A support as set forth in claim 8 in which said adjusting means comprises a pivoted nut in which the adjusting screw is threaded, the pivoted nut being mounted on said pedestal arm support, and a T-shaped anchorage member rotatably receiving the end of the screw against endwise movement therewith, spaced brackets on the pedestal arm, and removable means for connecting said member to said brackets at any one of a plurality of points, the axis of said screw intersecting the pivot axis of said pivoted nut and a removable pin extending transversely through said T-shaped anchorage member.

13. A support comprising in combination, a pedestal, a pedestal arm support mounted for lateral adjustment on said pedestal, a pedestal arm supported for vertical tilting movement about a horizontal axis on said pedestal arm support, and means for adjusting the position of said pedestal arm, said adjusting means comprising a screw of limited length, a pivoted nut in which the adjusting screw is threaded, the pivoted nut being mounted on said pedestal arm support and a T-shaped anchorage member rotatably receiving the end of the screw against endwise movement therewith, spaced brackets on the pedestal arm and movable means for connecting said member to said brackets at any one of a plurality of points.

ALBERT KINDELMANN.
CLAUDE A. SOEHL.